US009998579B2

(12) United States Patent
Wang

(10) Patent No.: US 9,998,579 B2
(45) Date of Patent: Jun. 12, 2018

(54) METHOD, APPARATUS, AND SYSTEM FOR DISPLAYING MESSAGE IN MOBILE TERMINAL

(71) Applicant: Tencent Technology (Shenzhen) Company Limited, Guangdong Province (CN)

(72) Inventor: Yulong Wang, Guangdong Province (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days. days.

(21) Appl. No.: 15/218,747

(22) Filed: Jul. 25, 2016

(65) Prior Publication Data

US 2016/0337503 A1    Nov. 17, 2016

Related U.S. Application Data

(63) Continuation of application No. PCT/CN2015/077733, filed on Apr. 28, 2015.

(30) Foreign Application Priority Data

Apr. 30, 2014  (CN) .......................... 2014 1 0182731

(51) Int. Cl.
*H04W 4/00*  (2009.01)
*H04M 1/725*  (2006.01)

(52) U.S. Cl.
CPC ... *H04M 1/72519* (2013.01); *H04M 1/72552* (2013.01)

(58) Field of Classification Search
CPC ........ H04H 20/61; H04H 60/07; H04H 20/57; H04H 60/73; H04M 1/72561; H04M 1/72583; H04W 88/023

(Continued)

(56) References Cited

U.S. PATENT DOCUMENTS

| 8,952,912 | B1* | 2/2015 | Hock ................... | G06F 3/0483 345/173 |
| 2009/0075761 | A1* | 3/2009 | Balardeta ............... | A63B 57/00 473/407 |

(Continued)

FOREIGN PATENT DOCUMENTS

| CN | 101159829 A | 4/2008 |
| CN | 101159859 A | 4/2008 |

(Continued)

OTHER PUBLICATIONS

International Search Report for Application No. PCT/CN2015/077733, dated Jul. 28, 2015, 2 pages.

(Continued)

*Primary Examiner* — Joseph Arevalo
(74) *Attorney, Agent, or Firm* — Venable LLP; Jeffri A. Kaminski

(57) ABSTRACT

According to a method for displaying a message in a mobile terminal, message content that needs to be displayed may be obtained, then a visible area on a screen of a mobile terminal is determined, and a display length and a quantity of display lines of the message content are calculated according to the visible area, and the message content is displayed in the visible area in a scrolling manner according to the calculated display length of the message content if the quantity of the display lines exceeds a display range of the visible area. In this way, only a small area of a screen is occupied, and message content can be displayed automatically and completely without the need for a user to perform a further operation. An apparatus and a system for displaying a message in a mobile terminal are also provided.

7 Claims, 5 Drawing Sheets

(58) Field of Classification Search
USPC ... 455/566, 426.1, 3.01, 458, 557, 466, 406, 455/41.3, 404.1, 3.02, 574, 701, 132.1, 455/411
See application file for complete search history.

(56) References Cited

U.S. PATENT DOCUMENTS

| | | | |
|---|---|---|---|
| 2010/0146378 | A1 | 6/2010 | Bank et al. |
| 2010/0268578 | A1* | 10/2010 | Fushimi ............ G06F 17/30867 705/7.29 |
| 2011/0163874 | A1* | 7/2011 | van Os ................ G01C 21/367 340/539.13 |
| 2013/0263022 | A1* | 10/2013 | Yue .................. H04M 1/72552 715/758 |
| 2013/0332850 | A1* | 12/2013 | Bovet .................... H04L 51/22 715/752 |
| 2014/0012922 | A1* | 1/2014 | Wu .................. G06F 17/30893 709/205 |

FOREIGN PATENT DOCUMENTS

| | | |
|---|---|---|
| CN | 102111505 A | 6/2011 |
| TW | 200631436 A | 9/2006 |
| TW | 200729943 A | 8/2007 |
| TW | 201104563 A | 2/2011 |
| TW | 201209605 A | 3/2012 |

OTHER PUBLICATIONS

Office Action of the Taiwan IPO for application No. 104103194, filed Jan. 30, 2015, 6 pages.

\* cited by examiner

METHOD, APPARATUS, AND SYSTEM FOR DISPLAYING MESSAGE IN MOBILE TERMINAL

PRIORITY CLAIM AND RELATED APPLICATION

This application is a continuation of International Application No. PCT/CN2015/077733, entitled "Method, Apparatus, and System for Displaying Message in Mobile Terminal" filed on Apr. 28, 2015, which claims priority to Chinese Patent Application No. 201410182731.2, entitled "METHOD, APPARATUS, AND SYSTEM FOR DISPLAYING MESSAGE IN MOBILE TERMINAL" filed on Apr. 30, 2014, both of which are incorporated by reference in their entirety.

TECHNICAL FIELD

The present disclosure relates to the field of communications technologies, and in particular, to a method, an apparatus, and a system for displaying a message in a mobile terminal.

BACKGROUND

Adding feedback, a chat interface, or the like to an application in a mobile terminal is an important manner for obtaining behavior and hobbies of users and improving a social feature. Particularly for some applications, for example, games, in a mobile terminal, a chat interface is more important. Although users usually do not input much chat information by using a chat interface on a mobile terminal, due to a limited screen size of a mobile device, an area provided for displaying chat information is generally small, considering that chat information should not affect a human-computer interaction effect.

Current manners for displaying a message (such as a text or a picture) in a mobile terminal may be broadly classified into the following types. A type of manner is static display in which a user can view different lines of a text or picture information by performing a slide operation. A type of manner is message notification in which a message is displayed on an upper edge of a screen in most cases, and a historical message may also be displayed when a user triggers the upper edge (for example, drags down the upper edge). Another type of manner is message prompting, and as the name implies, when information is received, only a message prompt pops up and actual message content is not displayed, and the actual message content is displayed only when a trigger of a user is received.

During research and practice of the existing technology, the inventor finds that these existing manners for displaying a message have poor display effects and all require a user to perform a further operation to display an entire message. This not only increases user interaction costs, but also leads to complex operations.

SUMMARY

A method for displaying a message in a mobile terminal includes:
 obtaining message content that needs to be displayed;
 determining a visible area on a screen of a mobile terminal;
 calculating a display length and a quantity of display lines of the message content according to the visible area; and
 displaying the message content in the visible area in a scrolling manner according to the display length if the quantity of the display lines exceeds a display range of the visible area.

An apparatus for displaying a message in a mobile terminal includes: an obtaining unit, a determining unit, a calculating unit, and a displaying unit, wherein
 the obtaining unit is configured to obtain message content that needs to be displayed;
 the determining unit is configured to determine a visible area on a screen of a mobile terminal;
 the calculating unit is configured to calculate a display length and a quantity of display lines of the message content according to the visible area; and
 the displaying unit is configured to display the message content in the visible area in a scrolling manner according to the display length when the quantity of the display lines exceeds a display range of the visible area.

A software operating system of a mobile terminal includes any apparatus for displaying a message in a mobile terminal provided in the embodiments of the present invention.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person skilled in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some of the embodiments of the present invention rather than all of the embodiments. All other embodiments obtained by a person skilled in the art based on the embodiments of the present invention without creative efforts shall fall within the protection scope of the present disclosure.

The embodiments of the present invention provide a method, an apparatus, and a system for displaying a message in a mobile terminal, which are separately described in detail below.

Embodiment 1

This embodiment is described from the perspective of an apparatus for displaying a message in a mobile terminal. The apparatus for displaying a message in a mobile terminal may specifically be integrated into a mobile terminal, and the mobile terminal may specifically be a mobile phone, a tablet computer, or another device.

A method for displaying a message in a mobile terminal includes: obtaining message content that needs to be displayed; determining a visible area on a screen of a mobile terminal; calculating a display length and a quantity of display lines of the message content according to the visible area; and displaying the message content in the visible area in a scrolling manner according to the display length if the quantity of the display lines exceeds a display range of the visible area.

Figure 1:
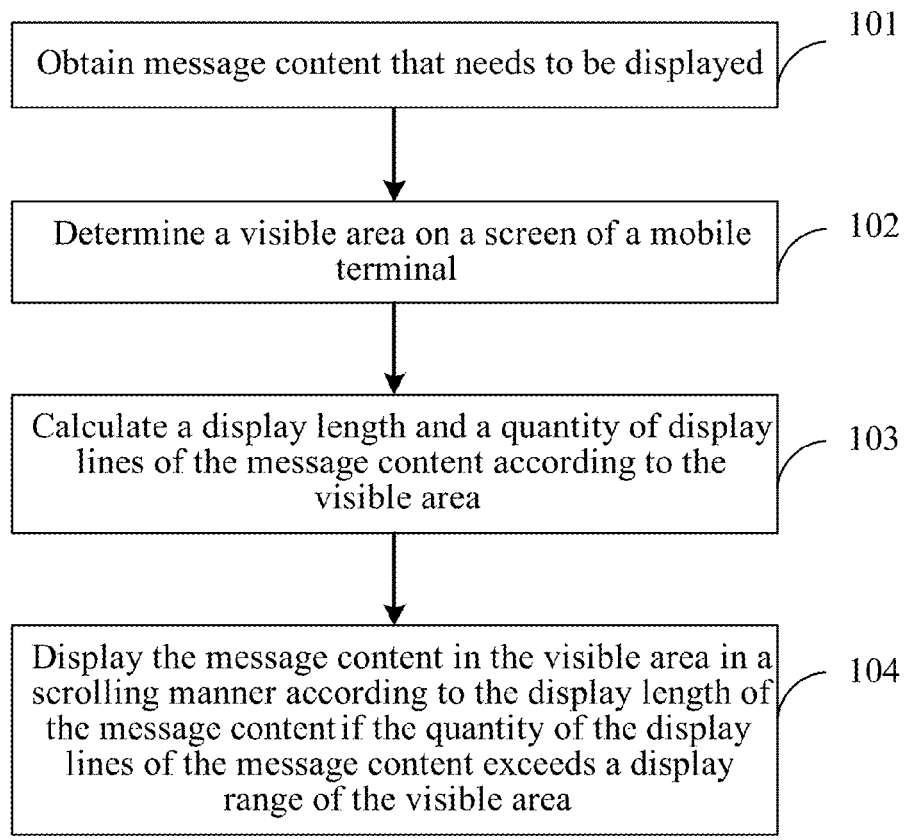
FIG. 1 is a flowchart of a method for displaying a message in a mobile terminal according to an embodiment of the present invention.

As shown in FIG. 1, a method for displaying a message in a mobile terminal may include the following specific processes:

101: Obtain message content that needs to be displayed.

The message content may be a text or a picture, or may include a text, a picture, and the like.

102: Determine a visible area on a screen of a mobile terminal.

The visible area refers to an area used for displaying message content on the screen of the mobile terminal. A position and a size of the visible area may be set according to an actual application requirement, or may be set by a system in advance, or may be set by a user. That is, before the determining a visible area on a screen of a mobile terminal, the method for displaying a message in a mobile terminal may further include:

setting the visible area on the screen of the mobile terminal according to a preset policy.

103: Calculate a display length and a quantity of display lines of the message content according to the visible area. For example, this step may specifically be as follows:

determining a length of the visible area, and calculating the display length and the quantity of the display lines of the message content according to the length of the visible area.

The display length of the message content is less than the length of the visible area, and may generally be set to be slightly less than the length of the visible area. The quantity of the display lines of the message content may be set according to a specific line height and line spacing and the display length of the message content.

A correspondence between the display length of the message content and the length of the visible area may be set according to an actual application requirement, and the line height and the line spacing of the message content may also be set according to an actual application requirement, which are not described in detail herein.

104: Display the message content in the visible area in a scrolling manner according to the display length of the message content if the quantity of the display lines of the message content exceeds a display range of the visible area, that is, if a display height of the message content (includes) exceeds a height of the visible area.

For example, the message content may specifically be displayed in the visible area in a scrolling manner according to the display length of the message content and a preset scrolling speed.

The scrolling speed may be set according to a time application requirement, and scrolling may be implemented by using a scroll control (scroll) or list (table), which are not described in detail herein.

It should be noted that if the quantity of the display lines of the message content does not exceed the display range of the visible area, that is, if the display height of the message content (includes) does not exceed the height of the visible area, the message content may be directly displayed in the visible area according to the display length of the message content without the need for scrolling.

Optionally, after the message content is displayed, it may be further set that the message content is automatically destroyed (that is, the message content is no longer displayed on the screen) after a preset time period. That is, after the step "display the message content in the visible area in a scrolling manner according to the display length (that is, step 104)", the method for displaying a message in a mobile terminal may further include:

destroying the message content when it is determined that display time of the message content exceeds a preset threshold.

The preset threshold may be set according to an actual application requirement, for example, may be set to 30 seconds, 60 seconds, 2 minutes, or the like, which is not described in detail herein.

It can be known from the foregoing that in this embodiment, message content that needs to be displayed may be obtained, then a visible area on a screen of a mobile terminal is determined, and a display length and a quantity of display lines of the message content are calculated according to the visible area, and the message content is displayed in the visible area in a scrolling manner according to the calculated display length of the message content if the quantity of the display lines exceeds a display range of the visible area. In this way, only a small area of a screen is occupied, and message content can be displayed automatically and completely without the need for a user to perform a further operation. This solution not only can reduce user interaction costs, but also simplifies an operation and greatly improves a display effect.

Embodiment 2

According to the method described in Embodiment 1, the following describes an example in further detail.

Figure 2A:
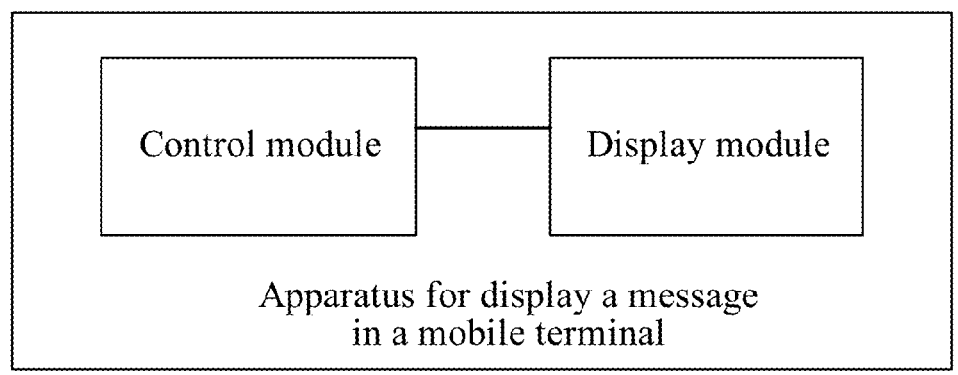
FIG. 2a is a schematic diagram of an apparatus for displaying a message in a mobile terminal according to an embodiment of the present invention.

As shown in FIG. 2a, the apparatus for displaying a message in a mobile terminal may include a control module and a display module, which are as follows:

(1) Control Module

The control module is configured to obtain message content that needs to be displayed, determine a visible area on a screen of a mobile terminal, calculate a display length and a quantity of display lines of the message content according to the visible area, control the display module to display the message content in the visible area in a scrolling manner according to the display length when the quantity of the display lines exceeds a display range of the visible area, and control the display module to directly display the message content in the visible area according to the display length when the quantity of the display lines does not exceed the display range of the visible area.

The control module may be further configured to destroy the message content when determining that display time of the message content exceeds a preset threshold.

(2) Display Module

The display module is configured to display the message content in the visible area in a scrolling manner according to the display length or directly display the message content in the visible area according to the display length under the control of the control module.

Based on the foregoing structure of the apparatus for displaying a message in a mobile terminal, the following describes specific execution processes in detail.

Figure 2B:
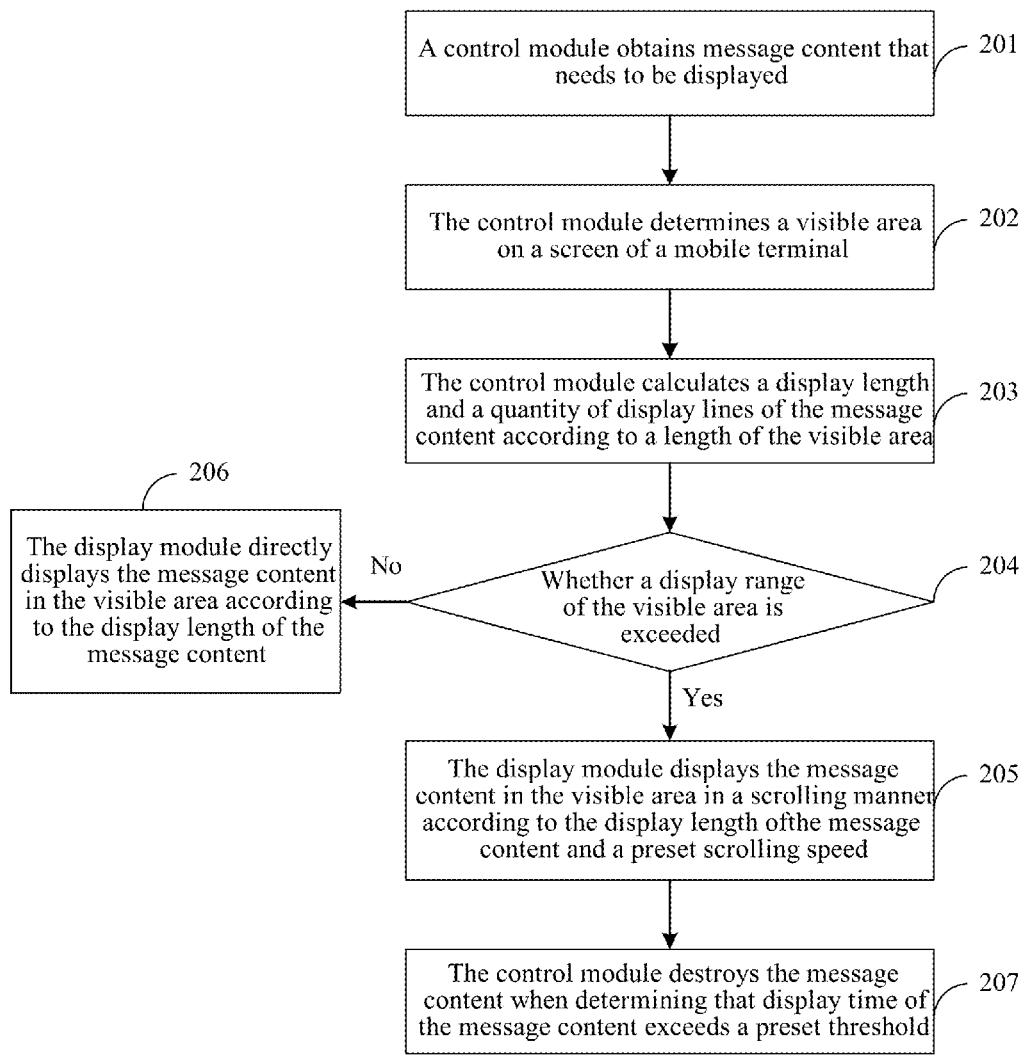
FIG. 2b is another flowchart of a method for displaying a message in a mobile terminal according to an embodiment of the present invention.

As shown in FIG. 2b, a method for displaying a message in a mobile terminal may include the following specific processes:

201: A control module obtains message content that needs to be displayed.

The message content may be a text or a picture, or may include a text, a picture, and the like.

202: The control module determines a visible area on a screen of a mobile terminal.

The visible area refers to an area used for displaying message content on the screen of the mobile terminal. A position and a size of the visible area may be set according to an actual application requirement, or may be set by a system in advance, or may be set by a user. That is, before the determining a visible area on a screen of a mobile terminal, the method for displaying a message in a mobile terminal may further include:

setting the visible area on the screen of the mobile terminal according to a preset policy.

203: The control module calculates a display length and a quantity of display lines of the message content according to a length of the visible area.

The display length of the message content is less than the length of the visible area, and may generally be set to be slightly less than the length of the visible area. The quantity of the display lines of the message content may be set according to a specific line height and line spacing and the display length of the message content.

A correspondence between the display length of the message content and the length of the visible area may be set according to an actual application requirement, and the line height and the line spacing of the message content may also be set according to an actual application requirement, which are not described in detail herein.

204: The control module determines whether the quantity of the display lines of the message content exceeds a display range of the visible area, and if yes, controls a display module to execute step 205, and if not, controls the display module to execute step 206.

205: The display module displays the message content in the visible area in a scrolling manner according to the display length of the message content and a preset scrolling speed. Then step 207 may be executed.

The scrolling speed may be set according to a time application requirement, and scrolling may be implemented by using a scroll control (scroll) or list (table), which are not described in detail herein.

206: The display module directly displays the message content in the visible area according to the display length of the message content. Then step 207 may be executed.

207: The control module destroys the message content when determining that display time of the message content exceeds a preset threshold.

The preset display time may be set according to an actual application requirement, for example, may be set to 30 seconds, 60 seconds, 2 minutes, or the like, which is not described in detail herein.

It can be known from the foregoing that in this embodiment, message content that needs to be displayed may be obtained, then a visible area on a screen of a mobile terminal is determined, and a display length and a quantity of display lines of the message content are calculated according to the visible area, and the message content is displayed in the visible area in a scrolling manner according to the calculated display length of the message content if the quantity of the display lines exceeds a display range of the visible area. In this way, only a small area of a screen is occupied, and message content can be displayed automatically and completely without the need for a user to perform a further operation. This solution not only can reduce user interaction costs, but also simplifies an operation and greatly improves a display effect.

Embodiment 3

A method for displaying a message in a mobile terminal provided in this embodiment of the present invention may be applied in various application scenarios such as feedback or a chat scenario in a game.

In this embodiment, using a chat scenario in a game as an example, the foregoing method for displaying a message in a mobile terminal is described in detail. For ease of description, this embodiment is described still by using the structure of the apparatus for displaying a message in a mobile terminal in Embodiment 2 as an example.

Figure 3A:
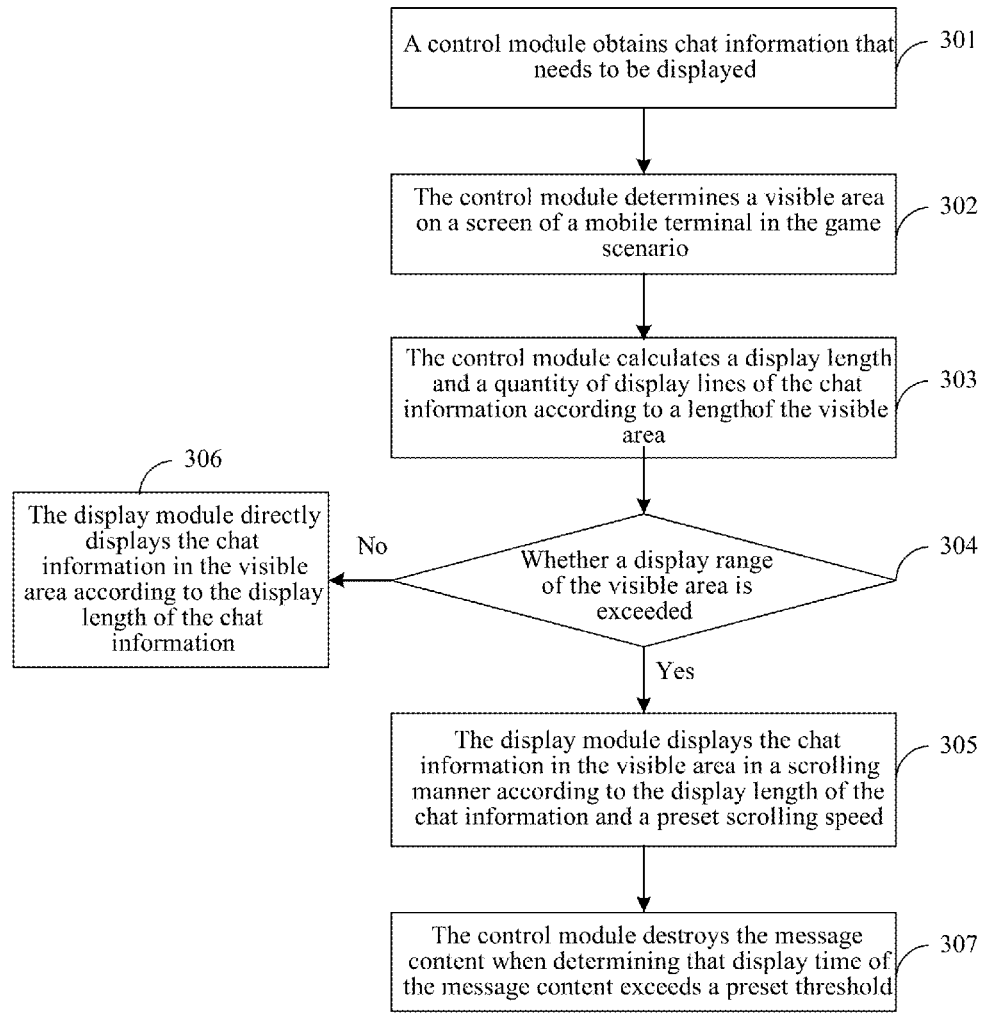
FIG. 3a is still another flowchart of a method for displaying a message in a mobile terminal according to an embodiment of the present invention.

As shown in FIG. 3a, a method for displaying a message in a mobile terminal may include the following specific processes:

301: A control module obtains message content that needs to be displayed, for example, may specifically receive chat information input by a user in the game scenario. For ease of description, chat information is used below for description as an example of the message content.

Content of the chat information may be a text or a picture, or may include a text, a picture, and the like.

302: The control module determines a visible area on a screen of a mobile terminal in the game scenario.

The visible area refers to an area used for displaying message content on the screen of the mobile terminal. A position and a size of the visible area may be set according to an actual application requirement, or may be set by a system in advance, or may be set by a user.

Figure 3B:
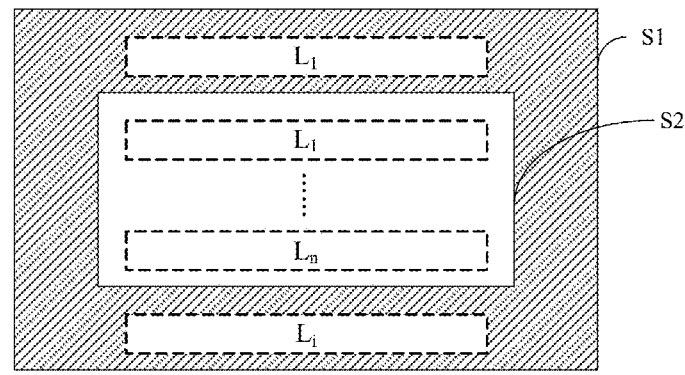
FIG. 3b is a schematic diagram of a screen of a mobile terminal according to an embodiment of the present invention.

For example, as shown in FIG. 3b, the figure is a schematic diagram of a screen of a mobile terminal in the game scenario. S1 is the screen of the mobile terminal, S2 is a visible area on the screen of the mobile terminal, and Li is (such as L1, Ln, and Li in the figure) is a line of message content that needs to be displayed.

303: The control module calculates a display length and a quantity of display lines of the chat information according to a length of the visible area.

The display length of the chat information is less than the length of the visible area, and may generally be set to be slightly less than the length of the visible area. The quantity of the display lines of the chat information may be set according to a specific line height and line spacing and the display length of the content of the chat information.

A correspondence between the display length of the chat information and the length of the visible area may be set according to an actual application requirement, and the line height and the line spacing of the chat information may also be set according to an actual application requirement, which are not described in detail herein.

304: The control module determines whether the quantity of the display lines of the chat information exceeds a display range of the visible area, and if yes, controls a display module to execute step 305, and if not, controls the display module to execute step 306.

305: The display module displays the chat information in the visible area in a scrolling manner according to the display length of the chat information and a preset scrolling speed. Then step 307 may be executed.

The scrolling speed may be set according to a time application requirement, and scrolling may be implemented by using a scroll control (scroll) or list (table), which are not described in detail herein.

For example, as shown in the schematic diagram of FIG. 3b, chat information is visible only when in the area S2, and becomes invisible once scrolled outside S2. That is, in the screen S1, chat information is visible only when in the area S2 and is invisible when in other areas.

Figure 3C:
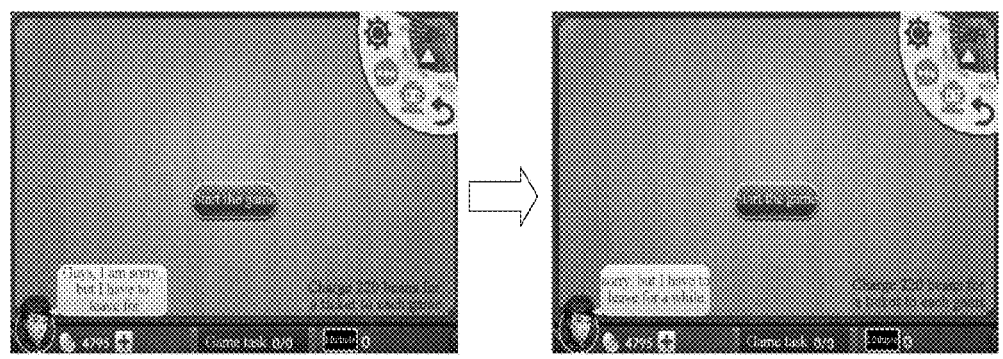
FIG. 3c is a schematic diagram of a scenario of a method for displaying a message in a mobile terminal according to an embodiment of the present invention.

For example, reference may be made to FIG. 3c. Because a quantity of lines of chat information "guys, I am sorry, but I have to leave for a while" already exceeds a display range of the visible area, the chat information is displayed in a scrolling manner.

306: The display module directly displays the chat information in the visible area according to the display length of the chat information. Then step 307 may be executed.

307: The control module destroys the message content when determining that display time of the message content exceeds a preset threshold.

The preset display time may be set according to an actual application requirement, for example, may be set to 30 seconds, 60 seconds, 2 minutes, or the like, which is not described in detail herein.

It should be noted that besides the foregoing application scenario, the method for displaying a message in a mobile terminal provided in this embodiment of the present invention may also be applied in another scenario, and an implementation manner in another scenario is similar to the foregoing manner and is not described in detail herein.

It can be known from the foregoing that in this embodiment, chat information that needs to be displayed may be obtained, then a visible area on a screen of a mobile terminal is determined, and a display length and a quantity of display lines of the chat information are calculated according to the visible area, and the chat information is displayed in the visible area in a scrolling manner according to the calculated display length of the chat information if the quantity of the display lines exceeds a display range of the visible area. In this way, only a small area of a screen is occupied, and chat information can be displayed automatically and completely without the need for a user to perform a further operation. This solution not only can reduce user interaction costs, but also simplifies an operation and greatly improves a display effect.

Embodiment 4

Figure 4:
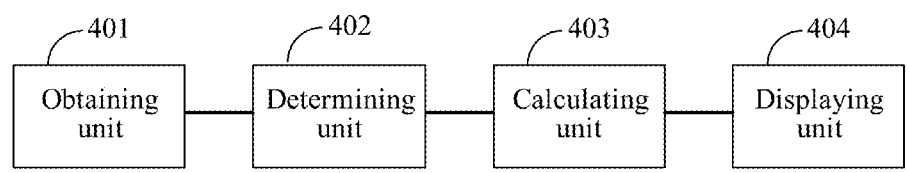
FIG. 4 is a schematic structural diagram of an apparatus for displaying a message in a mobile terminal according to an embodiment of the present invention.

In order to better implement the foregoing method, this embodiment of the present invention further provides an apparatus for displaying a message in a mobile terminal. As shown in FIG. 4, the apparatus for displaying a message in a mobile terminal includes an obtaining unit 401, a determining unit 402, a calculating unit 403, and a displaying unit 404, which are as follows:

The obtaining unit 401 is configured to obtain message content that needs to be displayed.

The message content may be a text or a picture, or may include a text, a picture, and the like.

The determining unit 402 is configured to determine a visible area on a screen of a mobile terminal.

The calculating unit 403 is configured to calculate a display length and a quantity of display lines of the message content according to the visible area.

For example, the calculating unit 403 may be specifically configured to determine a length of the visible area, and calculate the display length and the quantity of the display lines of the message content according to the length of the visible area.

The display length of the message content is less than the length of the visible area, and may generally be set to be slightly less than the length of the visible area. The quantity of the display lines of the message content may be set according to a specific line height and line spacing and the display length of the message content.

A correspondence between the display length of the message content and the length of the visible area may be set according to an actual application requirement, and the line height and the line spacing of the message content may also be set according to an actual application requirement, which are not described in detail herein.

The displaying unit 404 is configured to display the message content in the visible area in a scrolling manner according to the display length when the quantity of the display lines exceeds a display range of the visible area.

For example, the displaying unit 404 may be specifically configured to display the message content in the visible area in a scrolling manner according to the display length and a preset scrolling speed when the quantity of the display lines exceeds the display range of the visible area.

The scrolling speed may be set according to a time application requirement, and scrolling may be implemented by using a scroll control (scroll) or list (table), which are not described in detail herein.

It should be noted that if the quantity of the display lines of the message content does not exceed the display range of the visible area, that is, if a display height of the message content (includes) does not exceed a height of the visible area, the displaying unit 404 may directly display the message content in the visible area according to the display length of the message content without the need for scrolling.

The visible area refers to an area used for displaying message content on the screen of the mobile terminal. A position and a size of the visible area may be set according to an actual application requirement, or may be set by a system in advance, or may be set by a user. That is, the apparatus for displaying a message in a mobile terminal may further include a setting unit, wherein the setting unit is configured to set the visible area on the screen of the mobile terminal according to a preset policy.

Optionally, after the message content is displayed, it may be further set that the message content is automatically destroyed (that is, the message content is no longer displayed on the screen) after a preset time period. That is, the apparatus for displaying a message in a mobile terminal may further include a destroying unit, wherein the destroying unit is configured to destroy the message content when it is determined that display time of the message content exceeds a preset threshold.

The preset threshold may be set according to an actual application requirement, for example, may be set to 30 seconds, 60 seconds, 2 minutes, or the like, which is not described in detail herein.

For specific implementation of the foregoing units, reference may be made to the foregoing embodiments, which are not described repeatedly herein.

The apparatus for displaying a message in a mobile terminal may be specifically integrated into a mobile terminal, and the mobile terminal may specifically be a mobile phone, a tablet computer, or another device.

It should be noted that during specific implementation, the foregoing units may be implemented as independent entities, or may be combined in any manner and implemented as a same entity or several entities. For example, reference may be made to the structure of the apparatus for displaying a message in a mobile terminal in Embodiment 2 and Embodiment 3, which is not described repeatedly herein.

It can be known from the foregoing that in this embodiment, the obtaining unit 401 may obtain message content that needs to be displayed, then the determining unit 402 determines a visible area on a screen of a mobile terminal, and the calculating unit 403 calculates a display length and a quantity of display lines of the message content according to the visible area, and the displaying unit 404 displays the message content in the visible area in a scrolling manner according to the calculated display length of the message content if the quantity of the display lines exceeds a display range of the visible area. In this way, only a small area of a screen is occupied, and message content can be displayed automatically and completely without the need for a user to perform a further operation. This solution not only can reduce user interaction costs, but also simplifies an operation and greatly improves a display effect.

Embodiment 5

Correspondingly, this embodiment of the present invention further provides a software operating system of a mobile terminal, including any apparatus for displaying a message in a mobile terminal provided in the embodiments of the present invention. For the apparatus for displaying a message in a mobile terminal, reference may be specifically made to Embodiment 4, which may be as follows for example.

The apparatus for displaying a message in a mobile terminal is configured to obtain message content that needs to be displayed; determine a visible area on a screen of a mobile terminal; calculate a display length and a quantity of display lines of the message content according to the visible area; and display the message content in the visible area in a scrolling manner according to the display length if the quantity of the display lines exceeds a display range of the visible area.

It should be noted that if the quantity of the display lines of the message content does not exceed the display range of the visible area, that is, if a display height of the message content (includes) does not exceed a height of the visible area, the apparatus for displaying a message in a mobile terminal may directly display the message content in the visible area according to the display length of the message content without the need for scrolling.

The message content may be a text or a picture, or may include a text, a picture, and the like.

The visible area refers to an area used for displaying message content on the screen of the mobile terminal. A position and a size of the visible area may be set according to an actual application requirement, or may be set by a system in advance, or may be set by a user. That is, the apparatus for displaying a message in a mobile terminal may be further configured to set the visible area on the screen of the mobile terminal according to a preset policy.

Besides, after the message content is displayed, it may be further set that the message content is automatically destroyed (that is, the message content is no longer displayed on the screen) after a preset time period. That is, the apparatus for displaying a message in a mobile terminal may be further configured to destroy the message content when it is determined that display time of the message content exceeds a preset threshold.

The preset threshold may be set according to an actual application requirement, for example, may be set to 30 seconds, 60 seconds, 2 minutes, or the like, which is not described in detail herein.

For specific implementation of the foregoing operations, reference may be made to the foregoing embodiments, which are not described repeatedly herein.

It can be known from the foregoing that in this embodiment, the software operating system of a mobile terminal may obtain message content that needs to be displayed, then determines a visible area on a screen of a mobile terminal, and calculates a display length and a quantity of display lines of the message content according to the visible area, and displays the message content in the visible area in a scrolling manner according to the calculated display length of the message content if the quantity of the display lines exceeds a display range of the visible area. In this way, only a small area of a screen is occupied, and message content can be displayed automatically and completely without the need for a user to perform a further operation. This solution not only can reduce user interaction costs, but also simplifies an operation and greatly improves a display effect.

Embodiment 6

Figure 5:
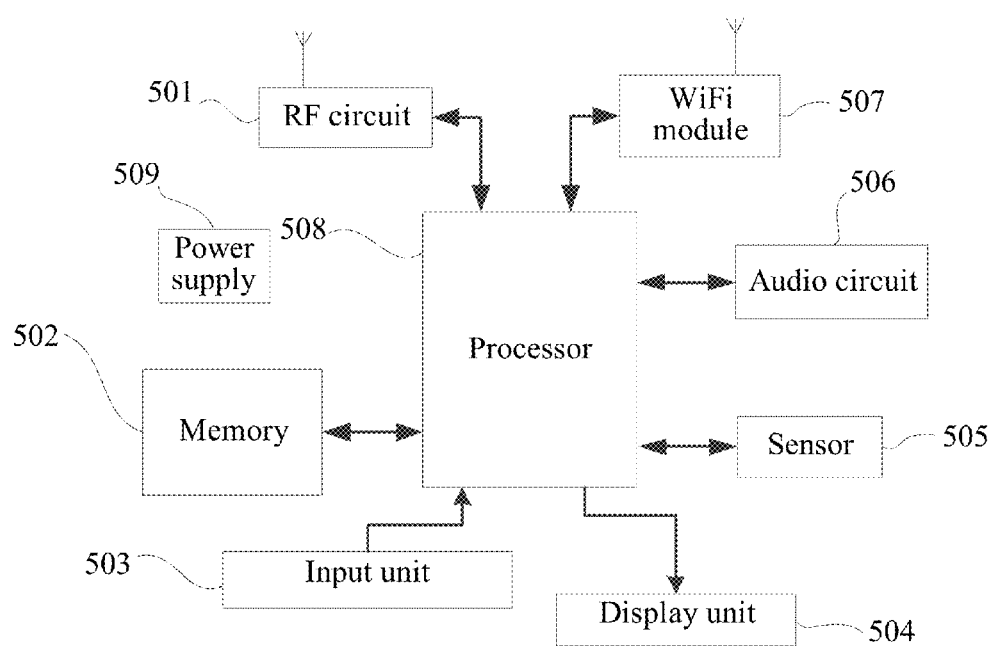
FIG. 5 is a schematic structural diagram of a mobile terminal according to an embodiment of the present invention.

Correspondingly, this embodiment of the present invention further provides a mobile terminal, into which any apparatus for displaying a message in a mobile terminal provided in the embodiments of the present invention can be integrated. As shown in FIG. 5, the mobile terminal may include components such as a radio frequency (RF) circuit 501, a memory 502 including one or more computer readable storage mediums, an input unit 503, a display unit 504, a sensor 505, an audio circuit 506, a wireless fidelity (WiFi) module 507, a processor 508 including one or more processing cores, and a power supply 509. A person skilled in the art may understand that the structure of the mobile terminal shown in FIG. 5 does not constitute a limitation on the mobile terminal, and the mobile terminal may include more components or fewer components than those shown in the figure, or some components may be combined, or a different component deployment may be used.

The RF circuit 501 may be configured to receive and send signals during an information receiving and sending process or a call process. Particularly, the RF circuit 501 receives downlink information from a base station, then delivers the downlink information to the processor 508 for processing, and sends designed uplink data to the base station. Generally, the RF circuit 501 includes, but is not limited to, an antenna, at least one amplifier, a tuner, one or more oscillators, a subscriber identity module (SIM) card, a transceiver, a coupler, a low noise amplifier (LNA), and a duplexer, and the like. In addition, the RF circuit 501 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 502 may be configured to store a software program and module. The processor 508 runs the software program and module stored in the memory 502, to implement various functional applications and data processing. The memory 502 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 502 may include a high speed random access memory, and may also include a non-volatile memory such as at least one magnetic disk storage device, a flash memory, or another volatile solid-state storage device. Correspondingly, the memory 502 may further include a memory controller, so as to provide access of the processor 508 and the input unit 503 to the memory 502.

The input unit 503 may be configured to receive input digit or character information, and generate a keyboard, mouse, joystick, optical, or track ball signal input related to the user setting and function control. Specifically, in a specific embodiment, the input unit 503 may include a touch-sensitive surface and another device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 508. Moreover, the touch controller can receive and execute a command sent from the processor 508. In addition, the touch-sensitive surface may be a resistive, capacitive, infrared, or surface sound wave type touch-sensitive surface. In addition to the touch-sensitive surface, the input unit 503 may further include the another input device. Specifically, the another input device may include, but is not limited to, one or more of a physical keyboard, a functional key (such as a volume control key or a switch key), a track ball, a mouse, and a joystick.

The display unit 504 may be configured to display information input by the user or information provided for the user, and various graphical user interfaces of the mobile terminal. The graphical user interfaces may be formed by a graph, a text, an icon, a video, or any combination thereof. The display unit 504 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 508, so as to determine the type of the touch event. Then, the processor 508 provides a corresponding visual output on the display panel according to the type of the touch event. Although, in FIG. 5, the touch-sensitive surface and the display panel are used as two separate parts to implement input and output functions, in some embodiments, the touch-sensitive surface and the display panel may be integrated to implement the input and output functions.

The mobile terminal may further include at least one sensor 505 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile terminal, are not further described herein.

The audio circuit 506, a loudspeaker, and a microphone may provide audio interfaces between the user and the mobile terminal. The audio circuit 506 may convert received audio data into an electric signal and transmit the electric signal to the loudspeaker. The loudspeaker converts the electric signal into a sound signal for output. On the other hand, the microphone converts a collected sound signal into an electric signal. The audio circuit 506 receives the electric signal and converts the electric signal into audio data, and outputs the audio data to the processor 508 for processing. Then, the processor 508 sends the audio data to, for example, another mobile terminal by using the RF circuit 501, or outputs the audio data to the memory 502 for further processing. The audio circuit 506 may further include an earplug jack, so as to provide communication between a peripheral earphone and the mobile terminal.

WiFi is a short distance wireless transmission technology. The mobile terminal may help, by using the WiFi module 507, the user to receive and send e-mails, browse a webpage, access streaming media, and so on, which provides wireless broadband Internet access for the user. Although FIG. 5 shows the WiFi module 507, it may be understood that the WiFi module is not a necessary component of the mobile terminal, and when required, the WiFi module may be omitted as long as the scope of the essence of the present disclosure is not changed.

The processor 508 is the control center of the mobile terminal, and is connected to various parts of the mobile phone by using various interfaces and lines. By running or executing the software program and/or module stored in the memory 502, and invoking data stored in the memory 502, the processor 508 performs various functions and data processing of the mobile terminal, thereby performing overall monitoring on the mobile phone. Optionally, the processor 508 may include one or more processing cores. Preferably, the processor 508 may integrate an application processor and a modem. The application processor mainly processes a software operating system, a user interface, an application program, and the like. The modem mainly processes wireless communication. It may be understood that the foregoing modem may also not be integrated into the processor 508.

The mobile terminal further includes the power supply 509 (such as a battery) for supplying power to the components. Preferably, the power supply may be logically connected to the processor 508 by using a power management system, thereby implementing functions such as charging, discharging and power consumption management by using the power management system. The power supply 509 may further include one or more of a direct current or alternating current power supply, a re-charging system, a power failure detection circuit, a power supply converter or inverter, a power supply state indicator, and any other components.

Although not shown in the figure, the mobile terminal may further include a camera, a Bluetooth module, and the like, which are not further described herein. Specifically, in this embodiment, the processor 508 in the mobile terminal loads an executable file corresponding to one or more processes of an application to the memory 502 according to the following instructions, and the processor 508 runs an application stored in the memory 502, thereby implementing various functions.

Although not shown in the figure, the mobile terminal may further include a camera, a Bluetooth module, and the like, which are not further described herein. Specifically, in this embodiment, the display unit of the mobile terminal is a touchscreen display. The mobile terminal further includes a memory and one or more programs, where the one or more programs are stored in the memory, and are set to be executed by one or more processors, and the one or more programs include instructions for performing the following operations:

obtaining message content that needs to be displayed; determining a visible area on a screen of the mobile terminal; calculating a display length and a quantity of display lines of the message content according to the visible area; and displaying the message content in the visible area in a scrolling manner according to the display length if the quantity of the display lines exceeds a display range of the visible area.

It should be noted that if the quantity of the display lines of the message content does not exceed the display range of the visible area, that is, if a display height of the message content (includes) does not exceed a height of the visible area, the message content may be directly displayed in the visible area according to the display length of the message content without the need for scrolling.

The message content may be a text or a picture, or may include a text, a picture, and the like.

Specifically, a length of the visible area may be determined first, and then the display length and the quantity of the display lines of the message content are calculated according to the length of the visible area.

The display length of the message content should be less than the length of the visible area, and may generally be set to be slightly less than the length of the visible area. The quantity of the display lines of the message content may be set according to a specific line height and line spacing and the display length of the message content. A correspondence between the display length of the message content and the length of the visible area may be set according to an actual application requirement, and the line height and the line spacing of the message content may also be set according to an actual application requirement, which are not described in detail herein.

The visible area refers to an area used for displaying message content on the screen of the mobile terminal. A position and a size of the visible area may be set according to an actual application requirement, or may be set by a system in advance, or may be set by a user. That is, before the visible area on the screen of the mobile terminal is determined, the following operation may be further executed:

setting the visible area on the screen of the mobile terminal according to a preset policy.

Besides, after the message content is displayed, it may be further set that the message content is automatically destroyed (that is, the message content is no longer displayed on the screen) after a preset time period. That is, after the "displaying the message content in the visible area in a scrolling manner according to the display length", the following operation may be further executed:

destroying the message content when it is determined that display time of the message content exceeds a preset threshold.

The preset threshold may be set according to an actual application requirement, for example, may be set to 30 seconds, 50 seconds, 2 minutes, or the like, which is not described in detail herein.

For specific implementation of the foregoing operations, reference may be made to the foregoing embodiments, which are not described repeatedly herein.

It can be known from the foregoing that in this embodiment, the mobile terminal may obtain message content that needs to be displayed, then determine a visible area on a screen of the mobile terminal, and calculate a display length and a quantity of display lines of the message content according to the visible area, and display the message content in the visible area in a scrolling manner according to the calculated display length of the message content if the quantity of the display lines exceeds a display range of the visible area. In this way, only a small area of a screen is occupied, and message content can be displayed automatically and completely without the need for a user to perform a further operation. This solution not only can reduce user interaction costs, but also simplifies an operation and greatly improves a display effect.

A person of ordinary skill in the art may understand that all or some of the methods in the embodiments may be implemented by a program instructing relevant hardware. The program may be stored in a computer-readable storage medium, and executed by one or more processors. The storage medium may include: a read-only memory (ROM), a random access memory (RAM), a magnetic disk, or an optical disc. The one or more processors may be a central processing unit (CPU) or a micro programmed control unit (MCU).

The method, apparatus, and system for displaying a message in a mobile terminal provided by the embodiments of the present invention are described above in detail. Specific examples are used in this specification to describe the principle and implementation manners of the present invention, but the foregoing descriptions of the embodiments are merely intended to help understand the method of the present invention and the core idea thereof. Besides, a person of ordinary skill in the art may make alterations to the specific implementation manners and application scope according to the idea of the present invention. In conclusion, the content of this specification shall not be understood as a limitation on the present invention. The sequence numbers of the above embodiments of the disclosure are only for the purpose of description, and do not represent one embodiment is superior to another.

What is claimed is:

1. A method for displaying a message in a mobile terminal performed at an apparatus having one or more processors and one or more memories for storing programs to be executed by the processors, the method comprising:

obtaining message content that needs to be displayed;

determining a visible area on a screen of a mobile terminal;

calculating a display length and a quantity of display lines of the message content according to the visible area; and displaying the message content in the visible area in a scrolling manner according to the display length if the quantity of the display lines exceeds a display range of the visible area, wherein the calculating a length and a quantity of lines of the message content according to the visible area comprises: determining a length of the visible area; and calculating the display length and the quantity of the display lines of the message content according to the length of the visible area;

the displaying the message content in the visible area in a scrolling manner according to the display length comprises: displaying the message content in the visible area in a scrolling manner according to the display length and a preset scrolling speed.

2. The method according to claim 1, wherein after the displaying the message content in the visible area in a scrolling manner according to the display length, further comprising:

destroying the message content when it is determined that display time of the message content exceeds a preset threshold.

3. The method according to claim 1, wherein before the determining a visible area on a screen of a mobile terminal, further comprising:

setting the visible area on the screen of the mobile terminal according to a preset policy.

4. An apparatus for displaying a message and executed by a mobile terminal, comprising multiple instruction units, and the multiple instruction units comprising:

an obtaining unit, configured to obtain message content that needs to be displayed;

a determining unit, configured to determine a visible area on a screen of a mobile terminal;

a calculating unit, configured to calculate a display length and a quantity of display lines of the message content according to the visible area; and a displaying unit, configured to display the message content in the visible area in a scrolling manner according to the display length and a preset scrolling speed when the quantity of the display lines exceeds a display range of the visible area, wherein the calculating unit is configured to determine a length of the visible area, and calculate the display length and the quantity of the display lines of the message content according to the length of the visible area.

5. The apparatus for displaying a message in a mobile terminal according to claim 4, further comprising a destroying unit, wherein the destroying unit is configured to destroy the message content when it is determined that display time of the message content exceeds a preset threshold.

6. The apparatus for displaying a message in a mobile terminal according to claim 4, further comprising a setting unit, wherein the setting unit is configured to set the visible area on the screen of the mobile terminal according to a preset policy.

7. A software operating system executed by a mobile terminal, comprising an apparatus for displaying a message and executed by a mobile terminal, the apparatus for displaying a message comprising multiple instruction units, and the multiple instruction units comprising:

an obtaining unit, configured to obtain message content that needs to be displayed;

a determining unit, configured to determine a visible area on a screen of a mobile terminal;

a calculating unit, configured to calculate a display length and a quantity of display lines of the message content according to the visible area; and a displaying unit, configured to display the message content in the visible area in a scrolling manner according to the display length and a preset scrolling speed when the quantity of the display lines exceeds a display range of the visible area, wherein the calculating unit is configured to determine a length of the visible area, and calculate the display length and the quantity of the display lines of the message content according to the length of the visible area.

* * * * *